(12) United States Patent
Thompson et al.

(10) Patent No.: US 6,176,074 B1
(45) Date of Patent: Jan. 23, 2001

(54) SHAFT DECOUPLE LOGIC FOR GAS TURBINE

(75) Inventors: Andrew Hayes Thompson, Longueuil; Carmine Lisio, Montreal North; Antonio Hernani Nobre, Brossard, all of (CA)

(73) Assignee: Pratt & Whitney Canada Corp., Longueuil (CA)

(*) Notice: Under 35 U.S.C. 154(b), the term of this patent shall be extended for 0 days.

(21) Appl. No.: 09/092,007

(22) Filed: Jun. 5, 1998

(51) Int. Cl.⁷ .................................................... F02C 7/00
(52) U.S. Cl. ........................................ 60/39.03; 60/39.091
(58) Field of Search ............................. 60/39.03, 39.091, 60/39.281

(56) References Cited

U.S. PATENT DOCUMENTS

| | | |
|---|---|---|
| 4,045,955 * | 9/1977 | Brannstrom et al. ............. 60/39.281 |
| 4,718,229 | 1/1988 | Riley . |
| 5,293,774 | 3/1994 | Ratherham . |
| 5,361,579 * | 11/1994 | Bachelder ...................... 60/39.281 |
| 5,440,490 | 8/1995 | Summerfield . |
| 5,732,546 * | 3/1998 | Pineo et al. ...................... 60/39.03 |

FOREIGN PATENT DOCUMENTS 59-093905    5/1984    (JP) .

* cited by examiner

Primary Examiner—Louis J. Casaregola
(74) Attorney, Agent, or Firm—Jeffrey W. Astle

(57) ABSTRACT

The present invention is addressed to a control logic for determining the occurrence of shaft decoupling in a gas turbine engine. The control logic in the preferred embodiment receives inputs for shaft rotational speed and/or compressor pressure and uses these parameters for making a determination of shaft decoupling in fractions of a second, before serious damage to the gas turbine engine can occur. The control logic also utilizes multiple interval sampling, and sampling over multiple channels to verify any determination of shaft decoupling. Once a shaft decouple has been verified, fuel flow to the engine is cut off, thus shutting down the engine.

10 Claims, 5 Drawing Sheets

SHAFT DECOUPLE LOGIC FOR GAS TURBINE

FIELD OF THE INVENTION

The present invention relates to a logic system for determining shaft failure in a gas turbine engine, and in particular, a method for sensing the immediate signs of shaft decoupling in a gas turbine engine, and an apparatus which performs these sensing functions.

BACKGROUND OF THE INVENTION

Gas turbine engines have been well known in the art for many years, and are engines in which a shaft containing a row of compressor blades serves as the drive shaft for generating a thrust output from the engine. Such engines are typically employed on aircraft, and can either be used in combination with propeller drive system to form a turboprop system, or without a propeller, as in a turboshaft, turbojet or turbofan system. Engines incorporating compressor blades on a single drive shaft are known as single axial flow compressor engines. Another type of engine is one which may include two coaxial drive shafts, in what is referred to as a dual axial flow compressor engine. In such an engine, rows of low pressure compressor blades are connected by a first drive shaft to a drive turbine. Downstream of these rows of low pressure compressor blades are rows of high pressure compressor blades connected to a second coaxial drive shaft which is driven by separate drive turbines.

Whether the engine is the single axial or dual axial type, the drive shafts must be capable of rotating at tens of thousands of Rpm's for hours at a time, under intense variations in temperature, acceleration, centrifugal stress, axial stress, etc.

After years of shaft usage, circumstances have arisen where one of the drive shafts separates from the remaining portion of the shaft. Because the drive shaft is rotating at such high rate of speed, failure or "decoupling" of the shaft will occur suddenly and rapidly. When a gas turbine engine experiences a shaft failure, the entire failure sequence may occur in less than one second, and produce a sudden catastrophic failure of the engine in which the rotating components of the engine upstream of the failure will suddenly decelerate, while rotating components downstream of the failure will begin to accelerate uncontrollably. The uncontrolled acceleration downstream of the failure poses the greatest hazard, because the rotational velocity of these components may reach a point where the centrifugal forces on these components cause them to shear away from the drive shaft, and impact the engine housing risking possible non-containment of these components within the engine housing. On a jet aircraft, such a non-containment could result in serious damage to the remaining portions of the engine, as well as damage to the aircraft fuselage.

Various attempts have been made to contain a component burst through the engine housing. In one such attempt, a solid containment ring formed of high strength material, such as a nickel cobalt alloy has been integrated into the outer engine housing to circumferentially surround the rotating components of the engine. Although such containment rings have been successful in containing fragmented components within the engine housing, they add a significant amount of additional weight to the engine, thus sacrificing fuel economy and passenger capacity. The trapping of failed engine components within the engine itself also results extensive, irreparable damage to the engine, often requiring that the entire engine be replaced after such a failure, thus adding substantial cost to the operation of the aircraft.

A need therefore exists to develop a warning protocol to identify the immediate signs of a drive shaft failure, and shut down the engine before the portions of the drive shaft downstream of the failure accelerate to a level that will place excessive stresses on the rotating components. Because these warning signs will appear only fractions of a second before the engine components start to fragment, it is evident that such a warning protocol must also be automated, preferably in the form of a control logic utilized by a high speed on board processor. If it becomes possible to shut down the engine while it is displaying the early warning signs of shaft failure, and before any component fragmentation occurs, the need for using heavy containment rings can be eliminated. In addition, damage to the engine resulting from the high speed component fragmentation can be eliminated as well. Most importantly, however, the safety of the operational engine can be significantly improved, since the chances of component fragmentation can be eliminated, thus improving the safety and integrity of the passenger compartment.

SUMMARY OF THE INVENTION

It is a feature of the present invention to provide a method for making a determination of immediate drive shaft failure and to cut off fuel flow to the engine when such imminent failure is detected, thus shutting down the engine.

It is another feature of the present invention to provide an electronic system which uses a control logic to make a determination of shaft failure, and to send a control to signal to a shut off system to shut off the fuel flow to the engine in response to a determination of shaft failure.

According to an aspect of the present invention, there is provided a method for controlling an operating turbine engine, the engine containing a rotating shaft connecting a compressor and a turbine downstream of the compressor, the method comprising the steps of: i) detecting a shaft shear condition; and ii) shutting off fuel flow to the engine in response to detecting the shaft shear condition. Preferably, this method further comprises the steps of: a) sensing a rotational speed of the shaft at two or more instances; b) calculating a rate of change of rotational speed of the shaft between the instances; and c) if the rate of change of rotational speed drops below a pre-determined limit, establishing a shaft shear condition. Additionally, this method further comprises the steps of: a) sensing a rotational speed of the shaft at two or more instances; b) calculating a rate of change of rotational speed of the shaft between the instances; c) if the rate of change of rotational speed drops below a pre-determined limit: 1) sensing a pressure downstream of the compressor at two or more instances; 2) calculating a change of the pressure between the instances change; and 3) if the change in pressure is below a pre-determined limit, establishing a shaft shear condition.

According to another aspect of the present invention, there is provided a method for controlling a turbine engine containing first and second coaxial rotatable shafts, a first row of blades connected to the first shaft and a second row of blades connected to the second shaft downstream of the first row of blades, the method comprising the steps of: i) sensing the rotational speed of the first row of blades; ii) sensing the rotational speed of the second row of blades; iii) comparing the rotational speed of the first row of blades with the second row of blades; and iv) if the speed of the first row of blades is not at a minimum required level relative to the speed of the second row of blades, shutting off fuel flow to the engine.

According to yet another aspect of the present invention, there is provided an apparatus for controlling a turbine engine, the engine containing a rotatable shaft connecting a compressor and a turbine downstream of the compressor, the apparatus comprising: a speed sensor adapted to sense rotational speed of the shaft; a processor adapted to receive and compare signals received from the speed sensor; and a fuel flow controller adapted shut off fuel flow to the engine in response to a signal received from the processor.

Finally, according to another aspect of the present invention, there is provided an apparatus for controlling a turbine engine containing first and second coaxial rotatable shafts, a first row of blades connected to the first shaft and a second row of blades connected to the second shaft downstream of the first row of blades, the apparatus comprising: a speed sensor adapted to sense rotational speed of first row of blades; a speed sensor adapted to sense rotational speed of the second row of blades; a processor adapted to receive and compare signals received from the speed sensors; and a fuel controller adapted shut off fuel flow to the engine in response to a signal received from the processor indicating a rotational speed of the first row of blades not at a minimum level in proportion to the rotational speed of the second row of blades.

DETAILED DESCRIPTION OF THE INVENTION

Figure 1:
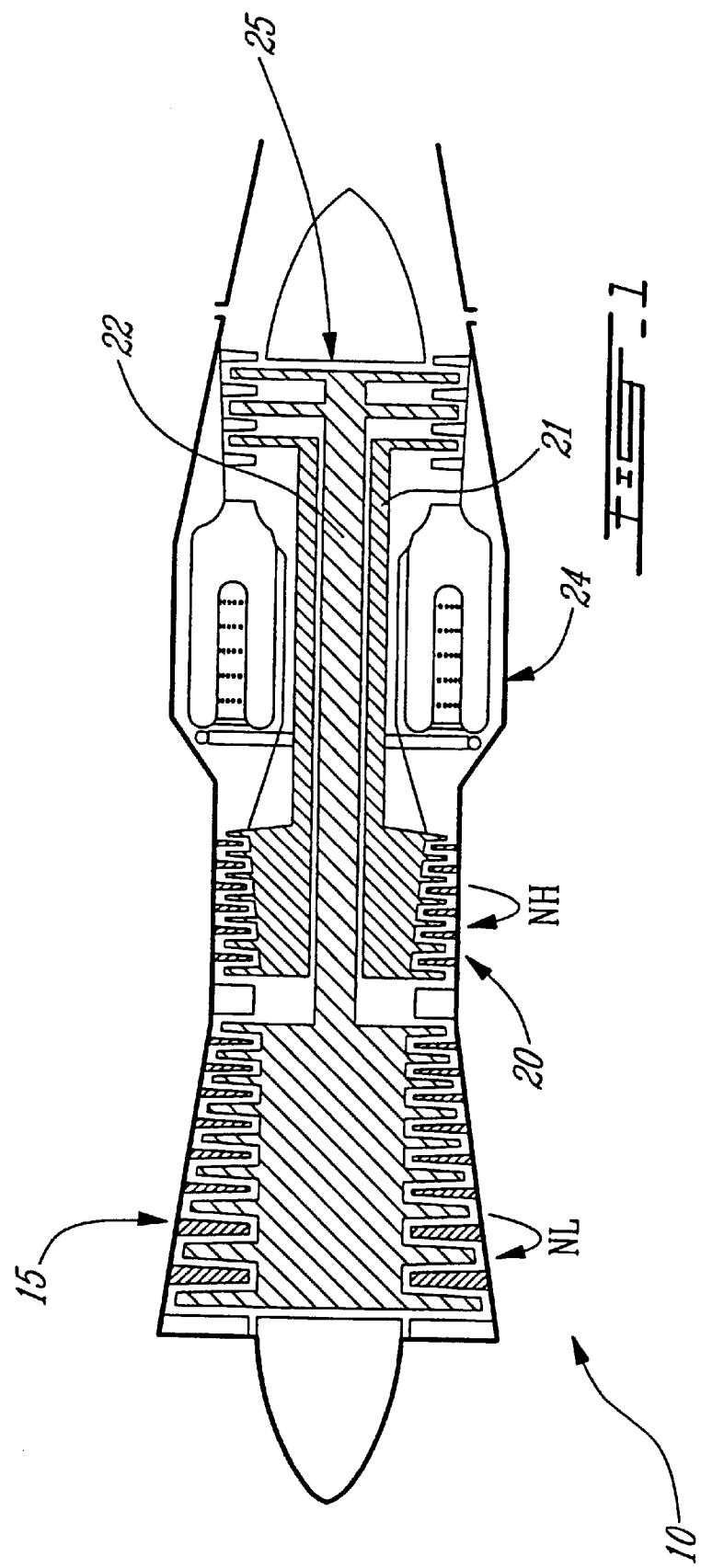
FIG. 1 is a cross sectional view of a dual shaft gas turbine engine.

FIG. 1 shows a cross sectional view of a standard dual shaft engine 10 which utilizes the dual axial compression system which compresses and pressurizes the air entering the combustion section of the engine. The engine 10 includes rows of low pressure compressor blades 15 which rotate on an inner shaft 22. The speed of the low pressure compressor blade rotation is indicated by the parameter "NL", which is shown near the forward end of the engine in FIG. 1. Downstream of the low pressure compressor blade section are rows of high pressure compressor blades 20. These blades rotate about a shaft 21 which coaxial with the low pressure shaft 22. The speed of rotation for this blade section is indicated by the parameter "NH", which is shown near the mid-section of the diagram shown in FIG. 1. Each of the shafts 21 and 22 are driven by separate turbines in the turbine section 25 of the engine.

In operation, the combustion section 24 generates the force necessary to drive the turbines in the turbine section 25. These turbines in turn drive the dual axial shafts 21 and 22 which drive and pressurize the airflow passing through the engine. Such an engine may also be operated as a turboprop type engine, by adding an additional turbine in the turbine section to drive a propeller at the front of the of the engine, or by other structural modifications known and understood by the person of ordinary skill in the art.

A critical concern in the operation of any type of gas turbine engine is the failure of a rotating shaft. Further, in any gas turbine application where fuel flow to the engine could continue to some extent notwithstanding the failure of a rotating shaft, such as in the dual shaft engine application described herein, it is desirable to provide means to shut off the fuel flow to the engine upon failure of the shaft. If, for example, the shaft 22 driving the low pressure compressor section 15 were to fracture or "decouple", the low pressure compressor section 15 would begin to suddenly decelerate, while the turbines driving the shaft 22, still fueled, would begin to accelerate uncontrollably, due to the suddenly reduced load on the shaft. With the onset of uncontrolled acceleration of these turbines, the turbines would rapidly exceed their maximum design speed, and begin breaking apart, producing high kinetic energy fragments capable of exiting the engine housing, unless the engine housing is otherwise protected by some type of containment structure. The entire sequence of events leading to such an engine failure can take much less than one second to occur, so the inventors herein have determined that such a failure must be detected at the earliest signs of failure, and the engine shut down must be performed by an automated system capable of reacting to the failure in fractions of a second.

In the preferred embodiment of the present invention, a logic sequence has been developed which determines the presence of shaft decoupling based on changes in certain parameters of the engine operation. Although the preferred embodiment provides a logic sequence for detecting shaft failure for the low pressure compressor shaft, an analogous logic sequence can be used for determining failure of the high pressure compressor shaft, as would be known and understood by the person of ordinary skill in the art from the following description.

Figure 2:
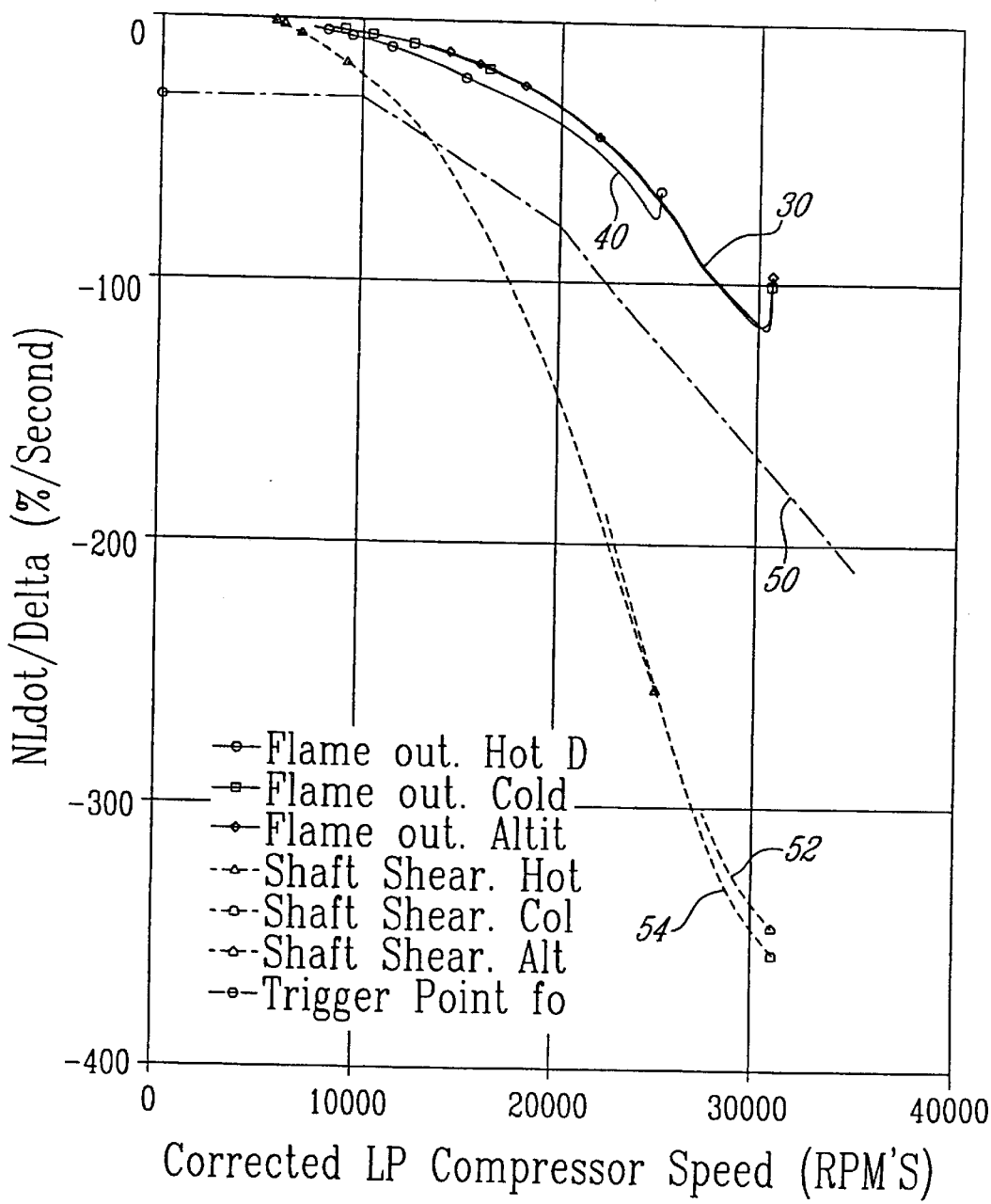
FIG. 2 is a diagram of normalized deceleration versus corrected rotational velocity for the low pressure compressor of a dual axial compression turboshaft engine.

FIG. 2 illustrates tests performed on a computer model of a turboprop engine utilizing dual axial compression arrangement described with respect to FIG. 1. The vertical axis illustrates deceleration, referred to be the parameter "NLDot", which has been normalized by the parameter "Delta". Such normalization permits comparative analysis of parameters or calculated amounts throughout the operating mission of the engine. The normalization of data is well known in the art of mathematics and statistics, and the steps necessary to perform such normalization would be known and understood by the person of ordinary skill in the art. The resulting parameter NLDot/Delta is plotted on the vertical axis in units of percentage change of velocity per second. The horizontal axis illustrates the corrected speed of the low pressure compressor in RPM's. Line 30 illustrates the deceleration condition which occurs under a cold flame out, while the line 40 illustrates the deceleration condition which occurs under a hot flame out. Line 50 represents a line of demarcation which has been found to be the line which separates decelerations that occur during known engine anomalies, such as flame out, and deceleration which can only be explained by shaft shear of the low pressure compressor shaft. Line 52 represents a shaft shear which is occurring at a cruising altitude, while line 54 illustrates a shaft shear which occur under high temperature conditions. Note that there is very little difference between the lines for shaft shear under the various operating conditions, although there is a readily measurable difference between the lines illustrating flame out, and the lines illustrating shaft shear.

The graph of FIG. 2 clearly illustrates that deceleration is the "footprint" which provides the clearest evidence of shaft failure, as well as being the evidence which appears most rapidly.

An advantage of utilizing the deceleration characteristics of the compressor portion of the shaft to detect shaft shear is that there will be an increase in the reliability of sensors used to detect the rotational speed of the compressor shaft when compared to sensors used in the hot turbine shaft areas of an engine.

Figure 3:
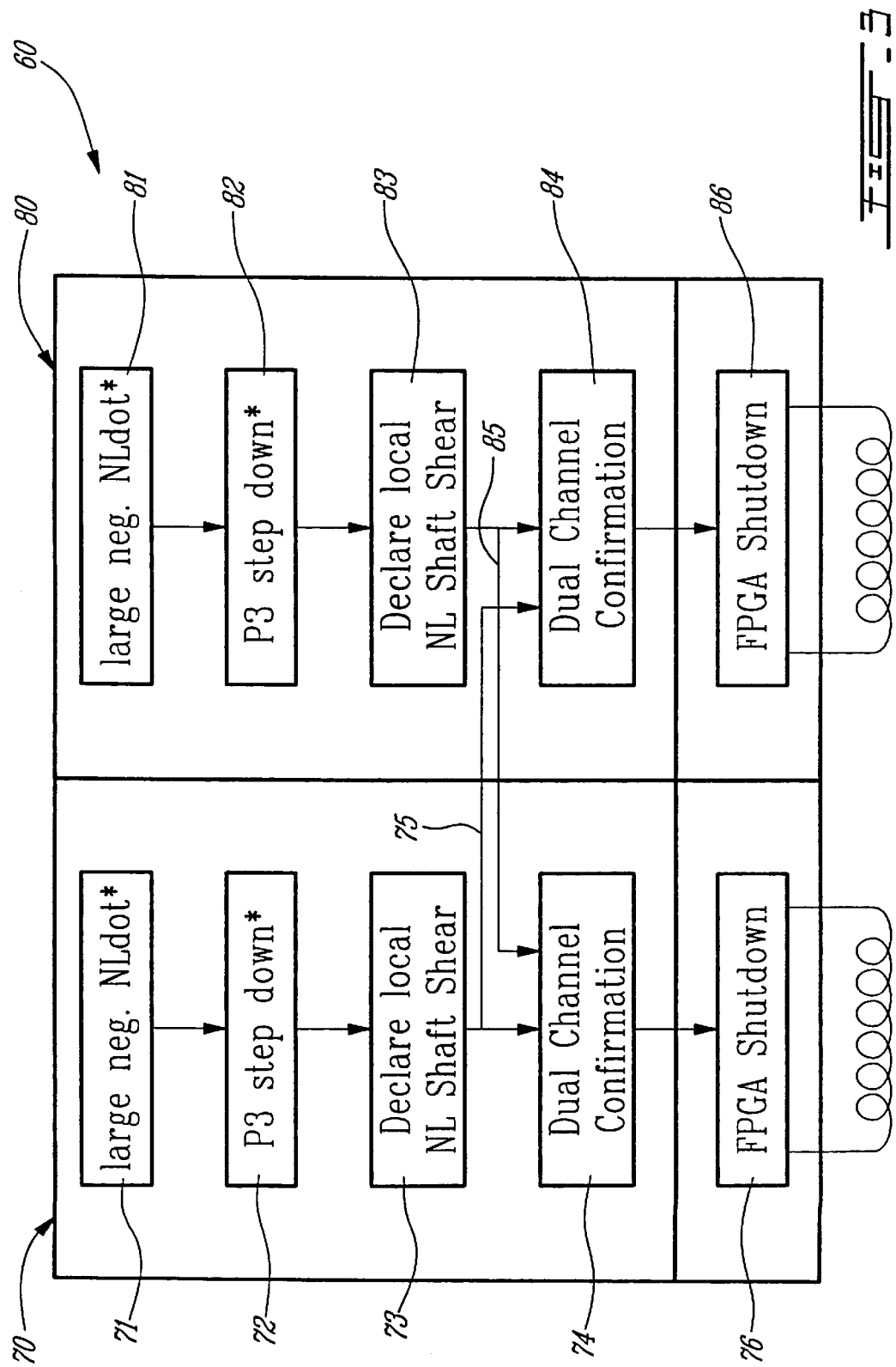
FIG. 3 is a logic diagram illustrating the steps necessary for detecting shaft decoupling and the sequence for shutting down the engine.

FIG. 3 illustrates the logic sequence 60, which can be utilized to immediately detect failure of the low pressure compressor shaft. The logic sequence is performed over two channels of a control processor known as a "Full Authority Digital Engine Control" or "FADEC". The FADEC is essentially a multi-channel on board computer that receives a limited number of inputs from the aircraft pilot as well as continuous input from the various sensors, switches, and drivers that are placed throughout the engine. The FADEC analyzes these various inputs from these devices and sends control signals back to these devices to manage their operation. FADEC systems are well known in the art, and were first disclosed in U.S. Pat. No. 4,718,229 to Riley, issued on Jan. 12, 1988.

The FADEC of the preferred embodiment of present invention is capable of performing a logic sequence that takes inputs of NL and P3 pressure to determine whether a shaft decouple has occurred.

One may choose to declare a shaft failure on the basis of the NLDot calculated from samples of NL; however, a more robust system would confirm the shaft failure by, for example, sensing unusual corresponding changes in P3. Preferably, in order to prevent inadvertent shut down of the engine under conditions where the shaft has not failed, the second parameter is used to verify that a failure is taking place.

It has been experimentally found that a parameter which changes rapidly during low pressure compressor shaft failure is the pressure at the entrance of the combustion chamber, referred to by the parameter "P3". This pressure is measured in the region of the engine between the downstream end of the high pressure compressor blades and the entrance to the combustion chamber. Experiments have demonstrated that a drop in the P3 pressure corresponds with shaft failure condition. Thus, parameter can be measured as a backup to verify any detection of shaft failure made by measuring sudden decelerations in the low speed compressor. Of course, other physical parameters equally affected by such failure may be measured as an alternative to the P3 parameter. For the purpose of the following description the invention will be described as incorporating the measurement of the P3 parameter within the logic sequence.

The input for deceleration can be derived from rotational speed sensors placed near the input end of the low pressure compressor blade section, or placed near the shaft for the low pressure compressor. Changes in rotational speed transmitted to the FADEC may be used to calculate acceleration or deceleration by the FADEC system. The P3 pressure is derived from pressure sensors placed at the entry of the combustion section, measuring absolute pressure in this area. One set of rotational speed and pressure sensors communicate with one channel of the FADEC, while a second set of rotational speed and pressure sensors communicate with a second, backup channel of the FADEC.

FIG. 3 shows the first FADEC channel 70 communicating with sensor inputs for NL 71 for calculating NLDot and P3 pressure drop 72. The logic sequence is as follows:

(1) The FADEC will sample the rotational speeds, and calculate normalized NLDot on one of the communications channels at about 20 millisecond intervals. The actual time interval between sampling may vary, but in the preferred embodiment, the sample time interval is between 20–30 milliseconds.

(2) If the calculated normalized NLDot exceeds the line of demarcation for normalized NLDot (derived from the graph of FIG. 2) in several consecutive samples, then this parameter will be set and the logic sequence will move on to testing P3. In the preferred embodiment, three successive samples of NL and calculations of NLDot will set the parameter, but a differing number of successive samples may be taken, such as one sample, or four or more samples.

(3) If the P3 value is below the predicted value for P3 under those particular engine operating conditions, then the logic will declare a shaft shear condition. In the preferred embodiment, the shaft shear condition is declared when the P3 value is 20 psia or more below the predicted value. However, the difference between the measured P3 and the predicted P3 necessary to declare a shaft failure may vary, such as would be understood by the person of ordinary skill in the art.

(4) If the logic declares a shaft shear, than confirmation of the finding is made by sending a signal 75 to backup channel 80, which is simultaneously performing the same sampling and comparison tests 81–83, that are being performed on channel 70. If channel 80 verifies the outcome, it sends a signal 85 back to channel 70, and both channels send signals for engine shutdown.

(5) Both channels will then agree and send signals to Field Programmable Gate Array Circuits (FPGA's) 76 and 86 respectively, which receive the signals from channels 70 and 80 and order a fuel cutoff to the engines, thus immediately decelerating the engine displaying the shaft shear condition.

The advantage of this logic sequence is threefold:

(1) The logic sequence is capable of declaring and verifying a shaft failure in a total time of about 80–100 milliseconds, depending upon the exact processing speed of the FADEC. Given the fact that fragmentation by the turbines downstream of the failure occurs less than one second after the shaft failure, the response time of 50–60 milliseconds gives the FADEC system the ability to shut down the engine before extensive damage is caused to the engine.

(2) The logic sequence and FADEC processor responds more rapidly to the failure than any human controller could ever respond. If the information on normalized NLDot and P3 were sent a to a pilot in a cockpit, even if the pilot were warned by a warning light of a sensed failure, the response time would be at least 5–25 seconds, which is not sufficiently fast to prevent damage to the engine. The logic sequence disclosed herein can be performed and executed in a time frame that is faster than normal human reflexes, and fast enough to prevent extensive damage to the engine or damage to the fuselage resulting from uncontained failure.

(3) The logic sequence utilizes multiple backups and logic agreements to prevent engine shut down under spurious conditions. The design of verifying normalized NLDot with multiple successive samples, the use of the P3 parameter for secondary confirmation, and the communication with a second channel for tertiary confirmation, all serve to prevent engine shut down unless all the data points to a shaft failure. This prevents the engine from being shutdown under spurious, or unpredictable conditions which are not the result of shaft failure. Ultimately, this permits safe usage of the logic system under a variety of different flight conditions.

Figure 4:
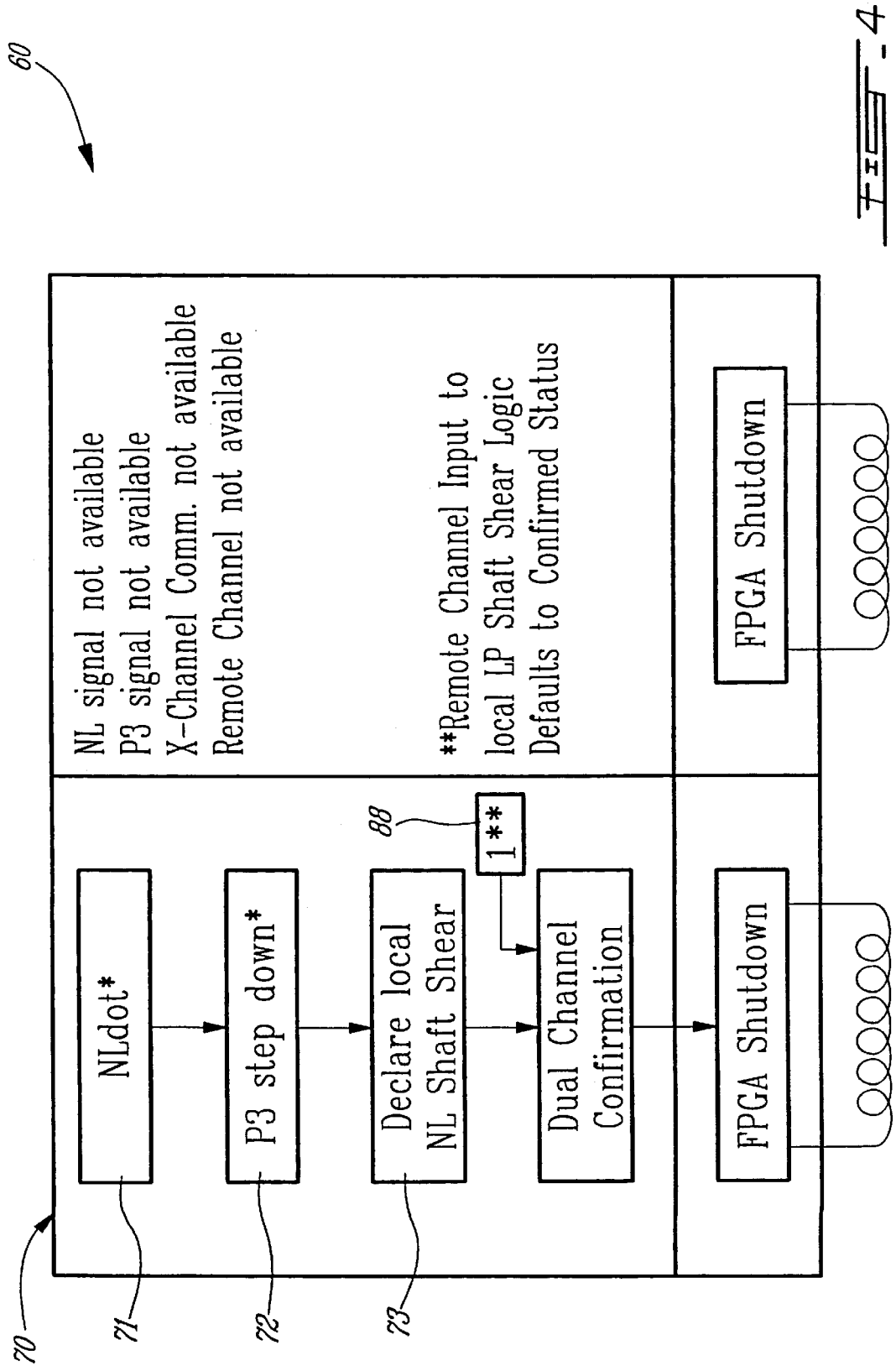
FIG. 4 is a logic diagram illustrating the steps necessary for detecting shaft decoupling and the sequence of events which take place when one of the communications channels fails.

FIG. 4 illustrates the system as it operates when one of the two channels communicating with the FADEC is not available. This might occur when one of the channels is not able to communicate with one of the sensors, or the channel has failed to connect with the FADEC processor. In FIG. 4, channel 70 is the operational channel, while channel 60 is the channel which is not functioning. In this mode of operation, the steps of checking an excessive NLDot 71, checking the P3 step down 72 and declaring the shaft shear failure 73 occur as normal. However, when the channel 60 is not available, it defaults to "Confirmed" status and confirms the conclusion reached on channel 70. The advantage of such a logic sequence is that the aircraft does not have to be taken out of service to repair the failure on the out of service channel 60 since the other channel 70 remains operable, and performs all the necessary steps for determining shaft failure. As a result, the aircraft is able to extend its "in-service" time while still performing the necessary failure checks.

FIGS. 1–4 are addressed to logic sequences which are preferred for use when the aircraft engine is fully running, such as would occur during flight at a cruise altitude or during take off. However, other logic sequences are preferably used during the initial start up of the engine, and the sub-idle run up of the engine. These logic sequences are illustrated in FIGS. 5 and 6 respectively.

Figure 5:
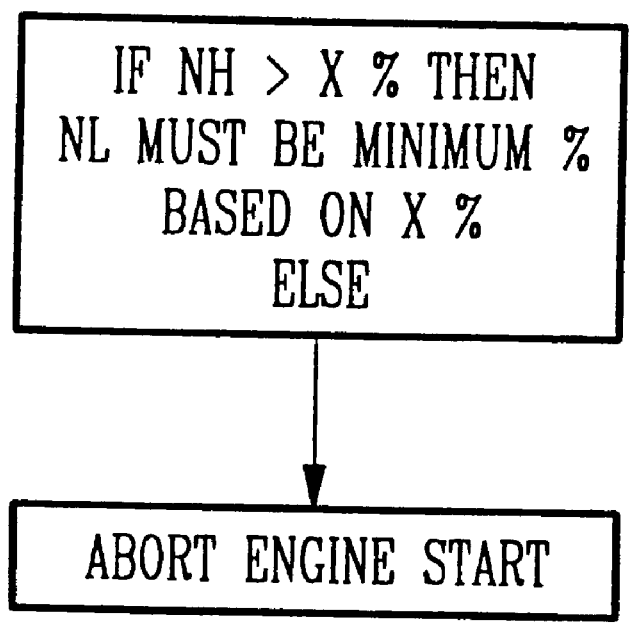
FIG. 5 is a logic diagram illustrating the steps necessary for detecting shaft decoupling and the sequence for shutting down the engine when a decouple is detected during initial start up, or running at low power settings.

FIG. 5 illustrates the logic sequence which is employed when the engine goes through its initial start up after ignition. "NH" represents the rotational velocity of the high speed compressor while "X %" represents the percent of velocity achieved by the high speed compressor in comparison to the maximum full throttle velocity for this compressor. "NL" represents the rotational velocity of the low speed compressor while "Minimum %" represents the percent of velocity achieved by the low speed compressor in comparison to the full throttle velocity. The actual values for the parameters X % and Minimum % will vary depending upon the type and design of engine involved, as would be understood by the person of ordinary skill in the art.

However, the Minimum % is always a function of the X %. In the preferred embodiment of the invention, where the logic sequence is applied to a turboprop engine, such as the type known as "PW150A", the preferred X % is between about 61% to 64%, representing between 19,000 and 20,000 RPM's. For this particular X %, the Minimum is between 27% and 28%, representing 7500 to 7510 RPM's.

The logic sequence of FIG. 5 operates by first testing the value for NH and assigning it a percentage of maximum RPM (X %). The value of NL is then tested and assigned a percentage of maximum RPM (Minimum %). If the Minimum % of RPM for the low speed compressor is not met for each value of X % of the high speed compressor measured at preferably three 20 millisecond intervals, than the engine start is aborted by shutting off fuel to the engine.

The logic sequence for the run up portion of the start prior to idle is essentially the same as that used for the initial start as shown in FIG. 5. NH is measured and assigned a value (X %) and NL is measured and assigned a value (Minimum %). If the Minimum % of RPM for the low speed compressor is not met for each value of X % of the high speed compressor, with measurements taken at multiple intervals, the engine start is aborted by shutting off fuel flow to the engine.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

The embodiments of the invention in which an exclusive property or privilege is claimed are defined as follows:

1. A method for controlling a turbine engine, the engine containing a rotating shaft connecting a compressor and a turbine downstream of the compressor, the method comprising the steps of:
    i) detecting a shaft shear condition;
    ii) shutting off fuel flow to the engine in response to detecting the shaft shear condition;
    characterized in that the shaft shear condition is determined by:
    a) sensing a rotational speed of the shaft at two or more instances;
    b) calculating a rate of change of rotational speed of the shaft between the instances; and
    c) if the rate of change of rotational speed is caused by a deceleration of the shaft below a predetermined limit, the shear condition exists.

2. The method claimed in claim 1, wherein the interval between sensing instances is between 20–30 milliseconds.

3. The method claimed in claim 1, where steps a) and b) are repeated and in step c), if the rate of change of rotational speed is caused by a deceleration below a predetermined limit for each step b) calculation, establishing a shaft shear condition.

4. The method claimed in claim 3, wherein steps a) and b) are repeated three times.

5. The method claimed in claim 1, wherein the rotational speed of the shaft is sensed near the compressor.

6. The method claimed in claim 1, wherein the engine compressor comprises an upstream end, with a first row of blades at the upstream end and wherein the rotational speed of the shaft is sensed upstream of the first row of blades.

7. The method of claim 6, wherein the rotational speed of the shaft is sensed adjacent the first row of blades.

8. A method for controlling a turbine engine, the engine containing a rotating shaft connecting a compressor and a turbine downstream of the compressor, the method comprising the steps of:
    i) detecting a shaft shear condition;
    ii) shutting off fuel flow to the engine in response to detecting the shaft shear condition;
    characterized in that the shaft shear condition is determined by:
    a) sensing a rotational speed of the shaft at two or more instances;
    b) calculating a rate of change of rotational speed of the shaft between the instances;
    c) if the rate of change of rotational speed is caused by a deceleration of the shaft below a predetermined limit:
    1) sensing a gas pressure downstream of the compressor at two or more instances;
    2) calculating a change of the pressure between the instances; and
    3) if the change in pressure is caused by a pressure reduction below a predetermined limit, the shaft shear condition is established.

9. The method claimed in claim 8, wherein the engine comprises a combustor with an entrance to the combustor from the compressor and the pressure is sensed at the entrance to the combustor.

10. The method claimed in claim 8, wherein both the sensing of step a) and the calculation of step b) are duplicated, and if in step c), the rate of change of rotational speed is caused by a deceleration below a predetermined limit for the duplicate calculations, establishing a shaft shear condition.

\* \* \* \* \*